United States Patent
Abe et al.

(10) Patent No.: US 9,598,002 B2
(45) Date of Patent: Mar. 21, 2017

(54) WORK VEHICLE AND ROTATING LIGHT

(71) Applicant: KOMATSU LTD., Tokyo (JP)

(72) Inventors: Hiroshi Abe, Hirakata (JP); Makoto Sasaki, Takatsuki (JP); Yukinori Maeda, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/423,216

(22) PCT Filed: Oct. 24, 2014

(86) PCT No.: PCT/JP2014/078408
§ 371 (c)(1),
(2) Date: Feb. 23, 2015

(87) PCT Pub. No.: WO2015/060448
PCT Pub. Date: Apr. 30, 2015

(65) Prior Publication Data
US 2016/0114721 A1 Apr. 28, 2016

(51) Int. Cl.
*F21V 17/02* (2006.01)
*B60Q 1/26* (2006.01)
(Continued)

(52) U.S. Cl.
CPC ............. *B60Q 1/2611* (2013.01); *B60Q 1/24* (2013.01); *B62D 33/0617* (2013.01);
(Continued)

(58) Field of Classification Search
CPC .................... B60Q 1/2611; B62D 33/0617
(Continued)

(56) References Cited

U.S. PATENT DOCUMENTS 3,930,227 A * 12/1975 Gof .......................... B60Q 1/52
116/43
5,010,454 A * 4/1991 Hopper .................. B60Q 3/007
362/183
(Continued)

FOREIGN PATENT DOCUMENTS

CN 202148552 U 2/2012
CN 104032784 A 9/2014
(Continued)

OTHER PUBLICATIONS

The International Search Report for the corresponding international application No. PCT/JP2014/078408, issued on Jan. 27, 2015.
(Continued)

*Primary Examiner* — Andrew Coughlin
*Assistant Examiner* — Jessica M Apenteng
(74) *Attorney, Agent, or Firm* — Global IP Counselors, LLP

(57) ABSTRACT

A hydraulic excavator is a work vehicle equipped with a work implement, including a cab and a rotating light. The rotating light is removably disposed on a roof of the cab. The rotating light has a rotating light main body, an attachment component, and a handle. The attachment component is provided on the lower side of the rotating light main body and is used to attach the rotating light main body to the roof. The handle is portal-shaped and fixed to the attachment component, and has a first rod-shaped part, a second rod-shaped part, and a third rod-shaped part. The first rod-shaped part and the second rod-shaped part are formed facing upward from the attachment component. The third rod-shaped part connects the first rod-shaped part and the second rod-shaped part together. The third rod-shaped part is disposed above the rotating light main body when viewed from the side and perpendicular to the lengthwise direction.

15 Claims, 14 Drawing Sheets

(51) Int. Cl.
*E02F 9/26* (2006.01)
*E02F 9/08* (2006.01)
*E02F 9/16* (2006.01)
*B60Q 1/24* (2006.01)
*B62D 33/06* (2006.01)

(52) U.S. Cl.
CPC ............ *E02F 9/0858* (2013.01); *E02F 9/163* (2013.01); *E02F 9/26* (2013.01)

(58) Field of Classification Search
USPC .................................. 362/540, 549, 548, 542
See application file for complete search history.

(56) References Cited

U.S. PATENT DOCUMENTS

| 5,490,046 A | 2/1996 | Gohl et al. |
|---|---|---|
| 2005/0149244 A1 | 7/2005 | Matsuda |

FOREIGN PATENT DOCUMENTS

| DE | 2654363 A1 | 6/1978 |
|---|---|---|
| DE | 4422150 C1 | 2/1996 |
| JP | 47-31368 U | 12/1972 |
| JP | 3-8203 A | 1/1991 |
| JP | 5-11079 Y2 | 3/1993 |
| JP | 9-21144 A | 1/1997 |
| JP | 2005-68830 A | 3/2005 |
| JP | 2007-284161 A | 11/2007 |
| JP | 2011-38315 A | 2/2011 |

OTHER PUBLICATIONS

Office Action for the corresponding Chinese patent application No. 201480002240.3, issued on Feb. 14, 2016.
The Office Action for the corresponding German application No. 11 2014 000 182.1, issued on May 24, 2016.
The Office Action for the corresponding Korean application No. 10-2015-7002192, dated Aug. 19, 2016.

\* cited by examiner

WORK VEHICLE AND ROTATING LIGHT

CROSS-REFERENCE TO RELATED APPLICATIONS

This application is a U.S. National stage application of International Application No. PCT/JP2014/078408, filed on Oct. 24, 2014.

BACKGROUND

Field of the Invention

The present invention relates to a work vehicle and a rotating light.

Description of the Related Art

Some hydraulic excavators, which is an example of a work vehicle, have the function of a bendable-jib type mobile crane. When crane work is performed with a hydraulic excavator such as this, a rotating light must be installed and able to flash. The rotating light is disposed on the roof of the cab, as shown in FIG. 1 of Japanese Laid-Open Patent Application 2005-68830, for example.

SUMMARY

However, the following problem is encountered with the conventional work vehicle discussed above. Depending on the height of the hydraulic excavator cab, the transport height restriction may be exceeded if a rotating light is installed on the roof of the cab. When this happens, the rotating light has to be removed from the roof before transport, and then reattached before work is begun, so there is a need for a rotating light that is easier to remove and attach.

It is an object of the present invention to provide a rotating light that is easier to remove and attach, and a work vehicle equipped with such a rotating light.

The work vehicle pertaining to a first exemplary embodiment of the present invention is a work vehicle equipped with a work implement, including a cab and a rotating light. The cab has a roof provided to the upper part, and a first lateral side face and second lateral side face provided on the left and right. The rotating light is disposed removably on the roof of the cab. The rotating light has a rotating light main body, an attachment component, and a handle. The attachment component is provided on the lower side of the rotating light main body and is used to attach the rotating light main body to the roof. The handle is portal-shaped and fixed to the attachment component. The handle has a first rod-shaped part, a second rod-shaped part, and a third rod-shaped part. The first rod-shaped part and second rod-shaped part are formed facing upward from the attachment component. The first rod-shaped part is disposed ahead of the second rod-shaped part. The second rod-shaped part is disposed to the rear of the rotating light main body, and is disposed more to the first lateral side face side than the first rod-shaped part. The third rod-shaped part is disposed above the rotating light main body when viewed from the side and perpendicular to the lengthwise direction.

When the rotating light is attached to the roof of the cab, because the roof is high up, the operator usually holds onto the cab with one hand and uses just the other hand to attach the rotating light. Here, the operator grasps the first rod-shaped part or second rod-shaped part, which are formed facing upward, which makes it easy to exert force in the up and down direction on the rotating light. Therefore, even when the rotating light is attached with one hand to the roof of the cab, shaking of the rotating light in the up and down direction tends to be prevented, and attachment and removal are easy.

Also, because the third rod-shaped part of the handle is provided higher than the rotating light main body, less of the light from the rotating light is blocked by the third rod-shaped part.

Also, because the handle is portal-shaped, the third rod-shaped part can be grasped when the rotating light is removed from the cab, making it easier to carry the light.

Also, because the handle is portal-shaped, it has better strength.

Also, because the second rod-shaped part is thus disposed to the rear of the rotating light main body, objects can be prevented from colliding with the rotating light main body from the rear.

The work vehicle pertaining to a second exemplary embodiment of the present invention is the work vehicle pertaining to the first exemplary embodiment of the present invention, wherein part of the third rod-shaped part is superposed with the rotating light main body in plan view.

Thus, forming the handle to straddle the rotating light main body allows the first rod-shaped part or second rod-shaped part to be disposed closer to the center of gravity of the rotating light. Therefore, the operator can more easily prevent the rotating light from shaking in the up and down direction.

The work vehicle pertaining to a third exemplary embodiment of the present invention is the work vehicle pertaining to the second exemplary embodiment of the present invention, wherein the rotating light main body has a base member, a light source, and a cover member. The base member is fixed to the attachment component. The light source is disposed on the inside of the base member. The cover member covers the light source from above and is removably attached to the base member. A specific gap is formed between the third rod-shaped part and the cover member to allow the cover member to pass through when the cover member is removed from the base member.

Because a specific gap is thus formed between the third rod-shaped part and the cover member, the cover member can be easily attached to and removed from the base member even though the handle is provided to surround the rotating light main body, and this makes replacement of the light source easier.

The work vehicle pertaining to a fourth exemplary embodiment of the present invention is the work vehicle pertaining to the first exemplary embodiment of the present invention, wherein the work implement is disposed to the side of the first lateral side face of the cab. The rotating light is disposed at the end of the roof on the second lateral side face side. The first rod-shaped part is disposed more to the second lateral side face side than the rotating light main body. Part of the first rod-shaped part is superposed with the rotating light main body when viewed from the second lateral side face side.

Because the rotating light is thus disposed above the second lateral side face of the cab on the opposite side from the work implement, the rotating light can be attached from outside the work vehicle, without the operator having to go inside the work vehicle.

Also, because part of the first rod-shaped part is superposed with the rotating light main body, the first rod-shaped part can be disposed closer to the rotating light main body. That is, since the first rod-shaped part can be disposed closer to the center of gravity of the rotating light, the operator can more easily prevent shaking of the rotating light in the up and down direction, making the rotating light easier to attach.

Also, because part of the first rod-shaped part is disposed more to the second lateral side face side than the rotating light main body, objects can be prevented from colliding with the rotating light main body from the second lateral side face side.

The work vehicle pertaining to a fifth exemplary embodiment of the present invention is the work vehicle pertaining to the first exemplary embodiment of the present invention, further comprising a base component that is fixed to the roof and to which the attachment component is removably attached. The base component has an engagement component and a guide component. The engagement component is capable of engaging with the attachment component. The guide component guides the attachment component to a position where it can be engaged by the engagement component, and has a restrictor. The restrictor restricts movement of the attachment component in a state of having been engaged with the engagement component after being guided. The attachment component has an engaged component and a restricted component. The engaged component is engaged to the engagement component. The restricted component is provided on the opposite side of the engaged component, flanking the rotating light main body. In a state in which the engagement component has engaged with the engaged component, the engaged component is biased downward and the restricted component is biased upward to hit the restrictor, fixing the attachment component to the base component.

Consequently, the attachment component can be fixed to the base component merely by disposing the attachment component to the base component along the guide component, and engaging the base component with the attachment component, so the rotating light can be easily attached to the roof. Also, the rotating light can be easily removed from the roof merely by releasing this engagement.

The work vehicle pertaining to a sixth exemplary embodiment of the present invention is the work vehicle pertaining to the fifth exemplary embodiment of the present invention, wherein the work implement is disposed to the side of the first lateral side face of the cab. The rotating light is disposed at the end of the roof on the second lateral side face side. The engagement component and the engaged component are provided on the second lateral side face side of the rotating light main body.

Because the engagement component is thus disposed above the second lateral side face of the cab on the opposite side from the work implement, the user can engage and disengage the engagement component from outside the work vehicle, without having to go inside the work vehicle, so the rotating light is easier to be attached and removed.

The work vehicle pertaining to a seventh exemplary embodiment of the present invention is the work vehicle pertaining to the sixth exemplary embodiment of the present invention, wherein the attachment component further has on its lower face a fixing member that magnetically fixes to the base component. Part of the third rod-shaped part is superposed with the rotating light main body when viewed from above. Part of the first rod-shaped part is superposed with the rotating light main body when viewed from the second lateral side face side. The engagement component and the engaged component are disposed in the approximate center of the rotating light main body in the front-back direction when viewed from the side on the opposite side from the work implement. The first rod-shaped part is disposed ahead of the engagement component and to the outside of the rotating light main body. The second rod-shaped part is disposed to the rear of the rotating light main body.

Because a fixing member is thus further provided for magnetically fixing the attachment component to the base component, it is less likely that the rotating light will accidentally fall off the roof when the engagement component is disengaged.

The work vehicle pertaining to an eighth exemplary embodiment of the present invention is a rotating light that is removably disposed on a roof provided at the upper part of the cab of a work vehicle. The rotating light has a rotating light main body, an attachment component, and a handle. The attachment component is provided on the lower side of the rotating light main body and is used to attach the rotating light main body to the roof. The handle is portal-shaped and is fixed to the attachment component. The handle has a first rod-shaped part, a second rod-shaped part, and a third rod-shaped part. The first rod-shaped part and the second rod-shaped part are formed facing upward from the attachment component. The third rod-shaped part connects the first rod-shaped part and the second rod-shaped part together. Part of the third rod-shaped part is superposed with the rotating light main body in plan view.

Thus forming the handle to straddle the rotating light main body allows the first rod-shaped part or the second rod-shaped part to be disposed closer to the center of gravity of the rotating light. Therefore, it is easier for the operator to prevent shaking of the rotating light in the up and down direction, which makes the rotating light easier to be installed on and removed from the roof.

The exemplary embodiments of the present invention provide a rotating light that is easier to handle during installation and removal, and a work vehicle equipped with such a rotating light.

DETAILED DESCRIPTION OF EXEMPLARY EMBODIMENTS

The work vehicle pertaining to an exemplary embodiment of the present invention will now be described through reference to the drawings.

1. Configuration 1-1. Overall Configuration of Hydraulic Excavator

Figure 1:
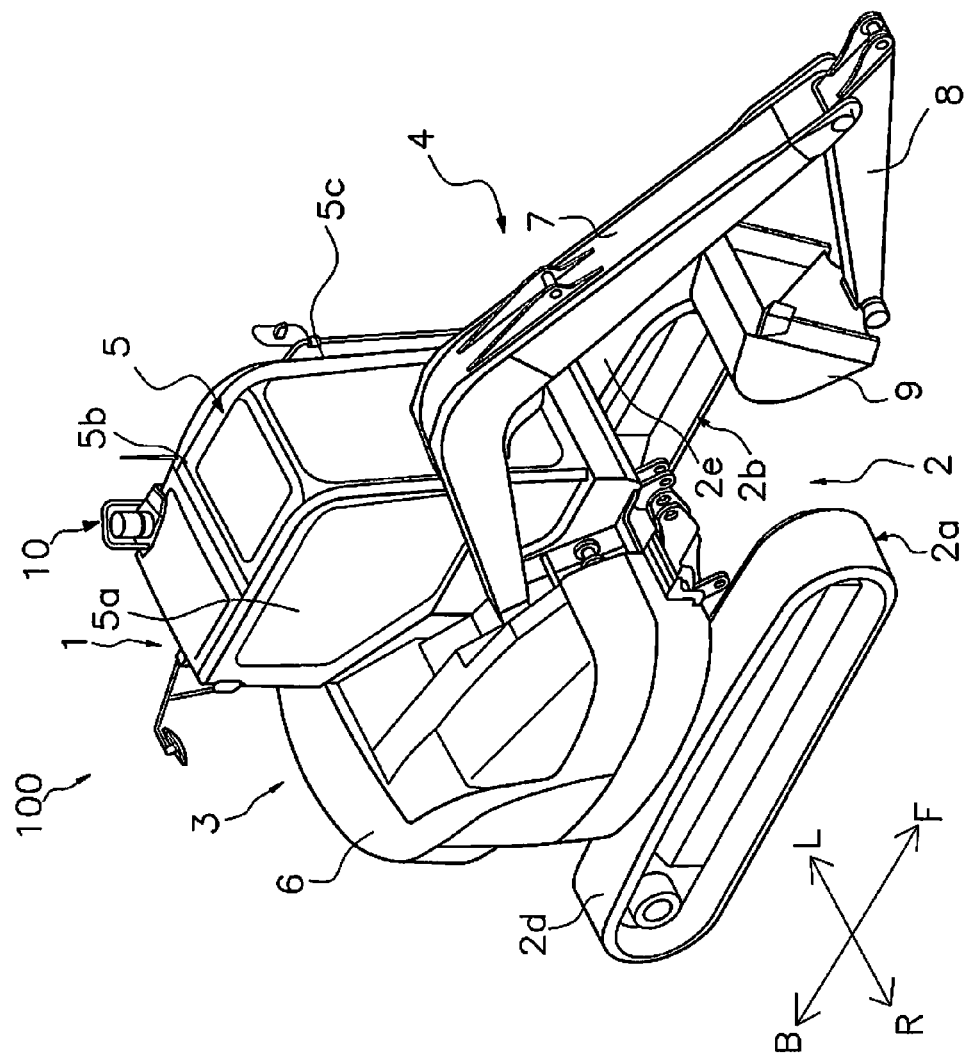
FIG. 1 is an oblique view of a hydraulic excavator pertaining to an exemplary embodiment of the present invention.

FIG. 1 is an oblique view of a hydraulic excavator 100 pertaining to an exemplary embodiment of the present invention. This hydraulic excavator 100 includes a vehicle body 1, a work implement 4, and a rotating light 10.

The vehicle body 1 has a traveling unit 2 and a revolving unit 3. The traveling unit 2 has a pair of travel apparatuses 2a and 2b. The travel apparatuses 2a and 2b have crawler belts 2d and 2e, and the hydraulic excavator 100 travels when the crawler belts 2d and 2e are driven by a drive force from an engine.

The revolving unit 3 is installed on the traveling unit 2. The revolving unit 3 is provided to be able to revolve with respect to the traveling unit 2. A cab 5 is provided as an operator's compartment at a location on the front-left side of the revolving unit 3.

In the description of the overall configuration, the front-back direction refers to the front-back direction of the cab 5. Further, the front-back direction of the vehicle body 1 coincides with the front-back direction of the cab 5, that is, of the revolving unit 3. The left and right direction, or "to the side," refers to the body width direction of the vehicle body 1. In FIG. 1, the arrow F indicates the forward (front) direction, the arrow B the rear (back) direction, the arrow L the left direction, and the arrow R the right direction. The same applies to the other drawings below.

The revolving unit 3 has a fuel tank, an engine, etc., and a counterweight 6 is provided to the rear thereof.

The work implement 4 has a boom 7, and an arm 8, and an excavation bucket 9, and is attached in the front middle position of the revolving unit 3. More precisely, the work implement 4 is disposed on the right side of a right lateral side face 5a of the cab 5. The proximal end of the boom 7 is rotatably linked to the revolving unit 3. The distal end of the boom 7 is rotatably linked to the proximal end of the arm 8. The distal end of the arm 8 is rotatably linked to the excavation bucket 9. Hydraulic cylinders (not shown) are disposed to correspond to the boom 7, the arm 8, and the excavation bucket 9. The work implement 4 is actuated when these hydraulic cylinders are driven. This is how excavation and other such work is carried out.

The rotating light 10 is provided to the roof 5b of the cab 5, to the rear of the end on the left lateral side face 5c side.

Figure 2:
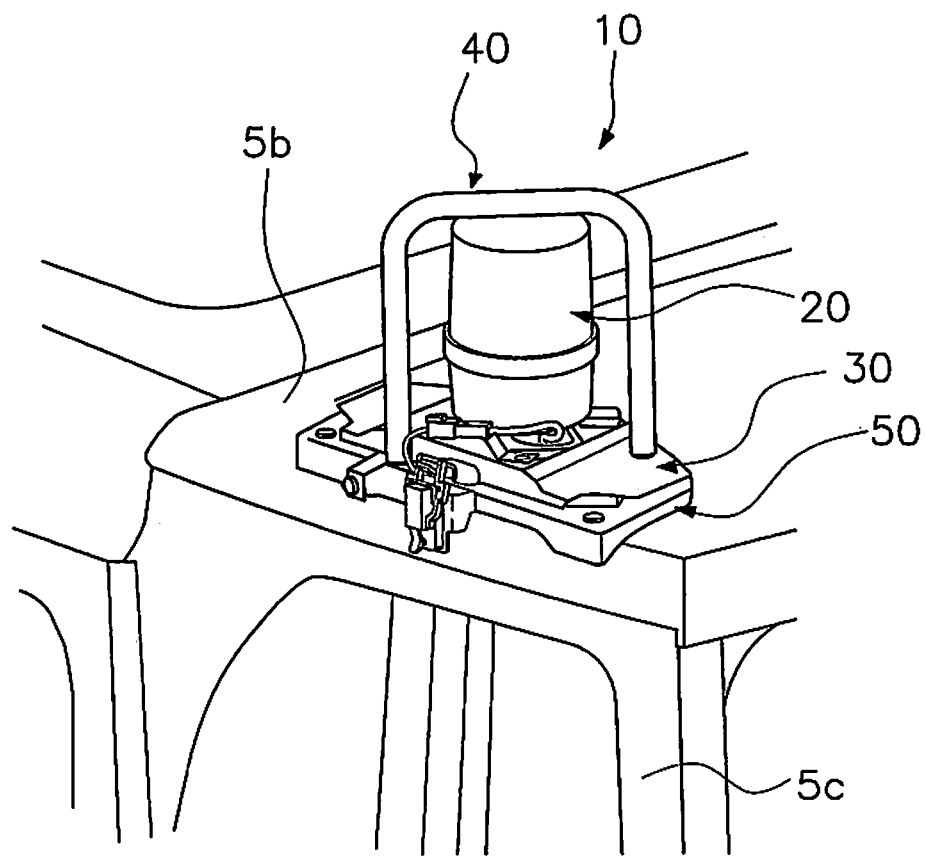
FIG. 2 is an oblique view of the area near a rotating light on the hydraulic excavator shown in FIG. 1.

FIG. 2 is an oblique view of the area near the rotating light 10 in this exemplary embodiment. As shown in FIG. 2, a base component 50 is fixed to the upper face of the roof 5b, and the rotating light 10 is removably fixed to the base component 50. That is, the rotating light 10 is attached to the roof 5b via the base component 50.

1-2. Summary of Rotating Light

The rotating light 10 has a rotating light main body 20 that emits light, an attachment component 30 for attaching the rotating light main body 20 to the base component 50, and a handle 40 that is grasped by the operator when attaching the attachment component 30 to the base component 50.

1-3. Rotating Light Main Body

Figure 3:
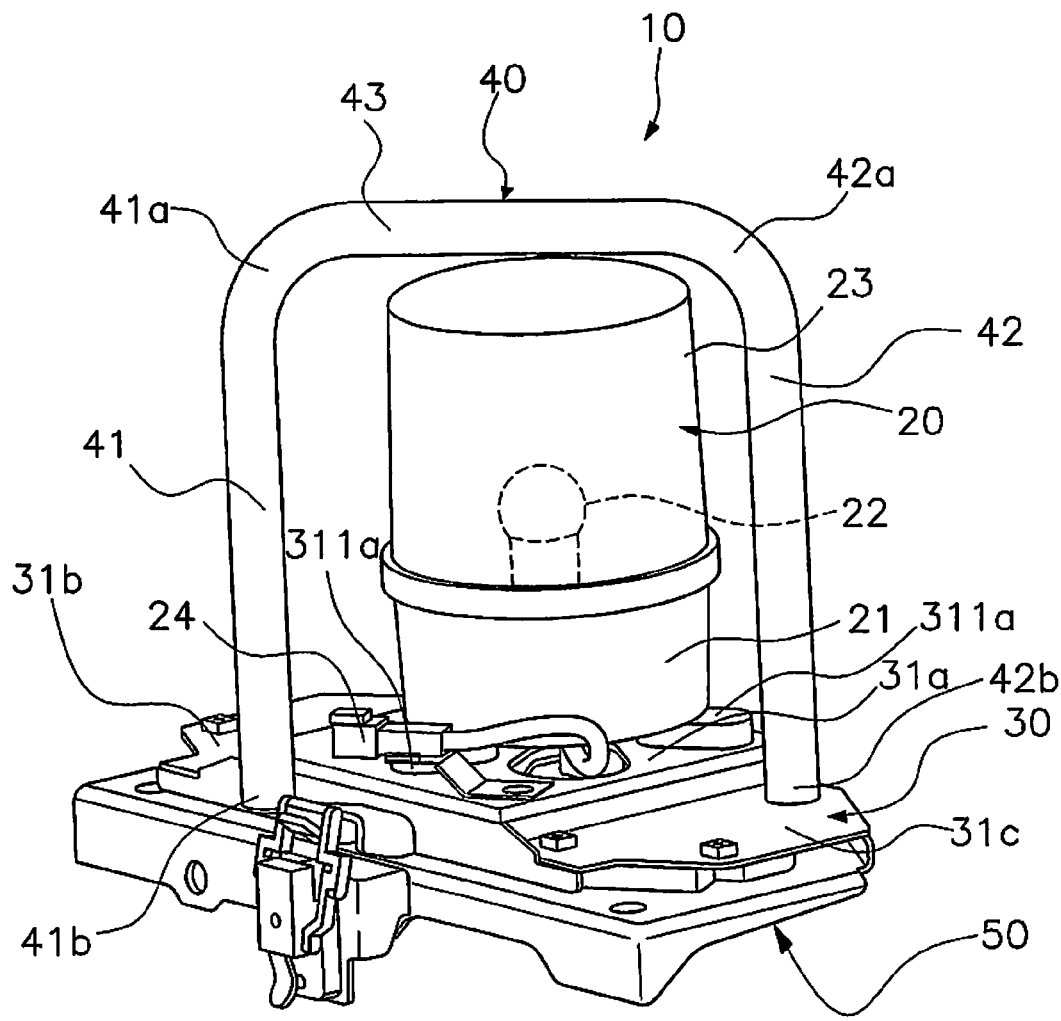
FIG. 3 is an oblique view of the state when the rotating light and base component in FIG. 2 are viewed from the left-rear side.

FIG. 3 is an oblique view of the state when the rotating light 10 and base component 50 are viewed from the left-rear side of the left lateral side face 5c.

As shown in FIG. 3, the rotating light main body 20 is substantially cylindrical in shape, and has a base member 21, a bulb 22, and a cover member 23. The base member 21 is in the form of a bottomed cylinder that is open at the top, and is fixed to the upper face of the attachment component 30. The bulb 22 is a light source, is disposed near the center of the base member 21, and can be replaced when it burns out. The cover member 23 is removably attached to the base member 21 to cover the bulb 22 from above. Although not depicted in the drawings, a reflector plate or the like is provided around the bulb 22. Also, FIG. 3 shows a connector 24 that is connected to wiring routed from the vehicle body 1 to supply electricity to the rotating light main body 20.

1-4. Attachment Component

Figure 4:
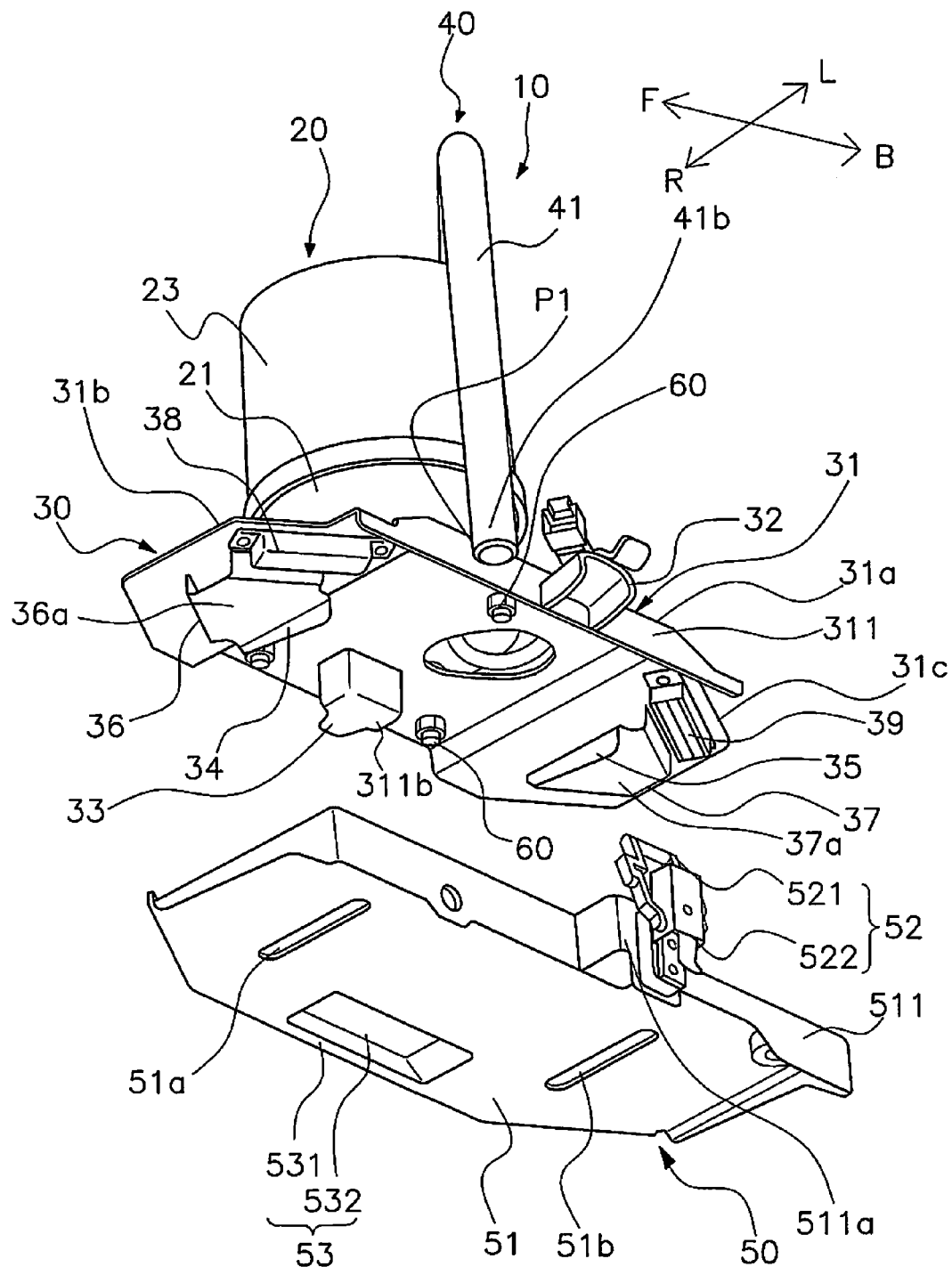
FIG. 4 is an oblique view of the state when the rotating light in FIG. 3 is removed from the base component, as viewed from the lower side.

FIG. 4 is an oblique view of the state when the rotating light 10 has been removed from the base component 50, as viewed from under the left lateral side face 5c.

As shown in FIG. 4, the attachment component 30 has a support component 31, an engaged component 32, a restricted component 33, a first positioning tab 34, a second positioning tab 35, a first contact component 36, a second contact component 37, a first magnet 38, and a second magnet 39.

As shown in FIG. 3, the support component 31 is a flat member with a stepped part formed in it, and has a first flat part 31a on the upper side of which is disposed the base member 21, a second flat part 31b provided on the front side of the first flat part 31a, and a third flat part 31c provided on the rear side of the first flat part 31a.

As shown in FIG. 4, the base member 21 of the rotating light main body 20 is disposed on the upper face of the first flat part 31a. More precisely, the base member 21 is disposed via a plurality of seats 311a (see FIG. 3). As shown in FIG. 4, the base member 21 is fixed by bolts 60 or the like from the lower face of the first flat part 31a.

The first contact component 36 is provided to the lower face of the second flat part 31b. As shown in FIG. 4, the first contact component 36 is formed by bending a flat member, and has a contact plane 36a that comes into contact with the base component 50. The first positioning tab 34 protrudes downward from the rear side of the contact plane 36a. This first positioning tab 34 extends in the left and right direction, and is formed such that the length in which it extends downward decreases from the left to the right side. The first magnet 38 is disposed on the right side of the first contact component 36.

The second contact component 37 is provided to the lower face of the third flat part 31c. As shown in FIG. 4, the second contact component 37 is formed by bending a flat member, and the second contact component 37 has a contact plane 37a that comes into contact with the base component 50. The second positioning tab 35 protrudes downward from the rear side of the contact plane 37a. The second positioning tab 35 extends in the left and right direction, and is formed such that the length in which it extends downward decreases from the left to the right side. The second magnet 39 is disposed on the right side of the second contact component 37.

As shown in FIG. 4, the engaged component 32 is provided on the left lateral side face 5c side of the first flat part 31a. More precisely, the engaged component 32 protrudes to the left lateral side face 5c side from a border part 311 formed facing downward from the left end of the first flat part 31a.

Figure 5:
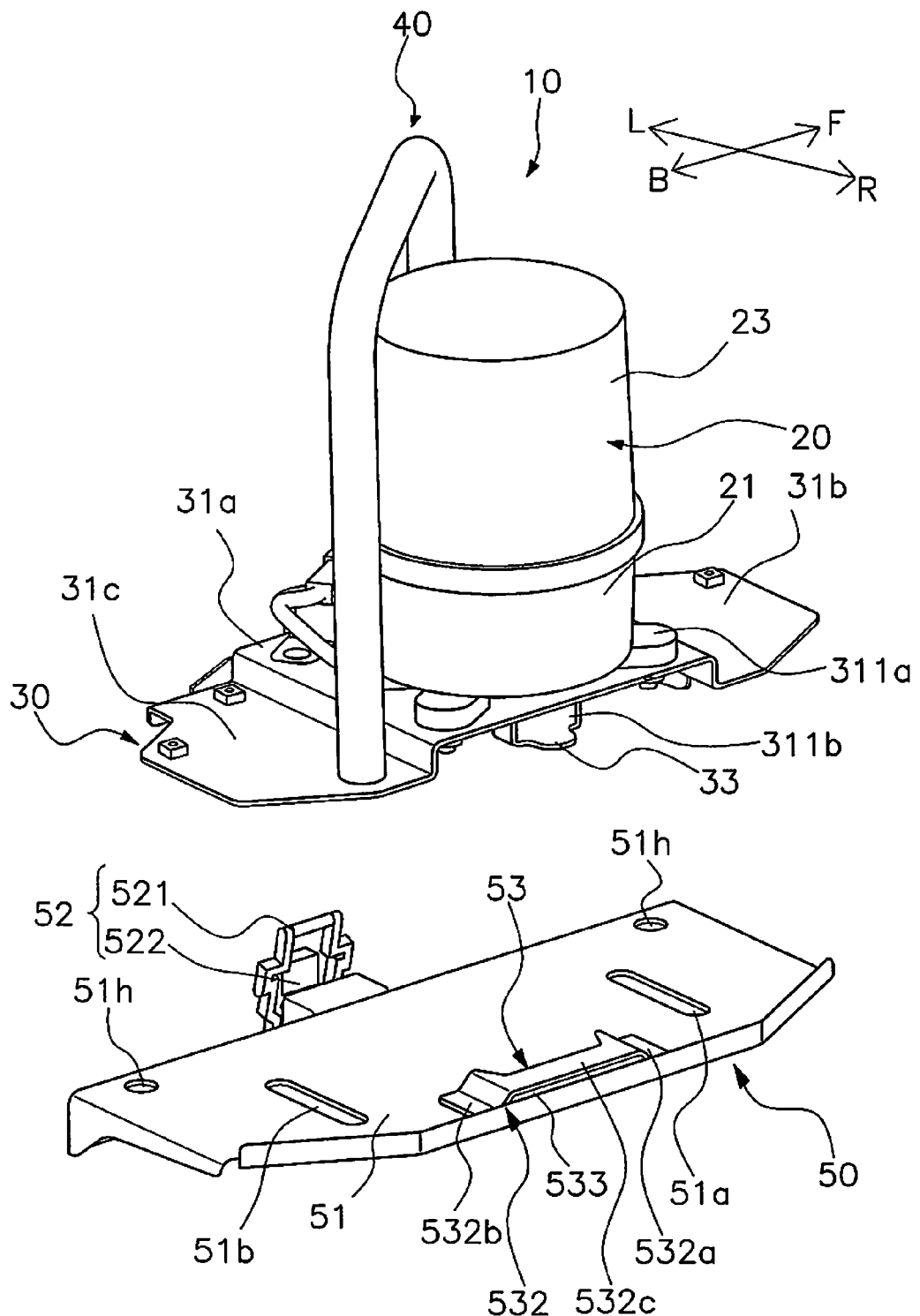
FIG. 5 is an oblique view of the state in FIG. 4 when viewed from the upper-right side.

FIG. 5 is an oblique view of the state in FIG. 4 when viewed from above the right lateral side face 5a side.

The restricted component 33 is provided to the lower side of the first flat part 31a. More precisely, a seat 311b is provided to the lower face of the first flat part 31a, and the restricted component 33 is formed to protrude to the right from the lower side of the seat 311b. The restricted component 33 is a flat member, and is provided substantially parallel to the first flat part 31a, leaving a space between the restricted component 33 and the first flat part 31a corresponding to the height of the seat 311b.

1-5. Base Component

As shown in FIG. 4, the base component 50 comprises a base main body 51, a clasp main body 52, and a guide component 53.

The base main body 51 is a substantially flat member, and is formed from metal. As shown in FIG. 5, the base main body 51 has a plurality of through-holes 51h formed in itself, and the base component 50 is fixed to the roof 5b of the cab 5 by passing bolts or the like through the through-holes 51h and fastening them with nuts.

Figure 6:
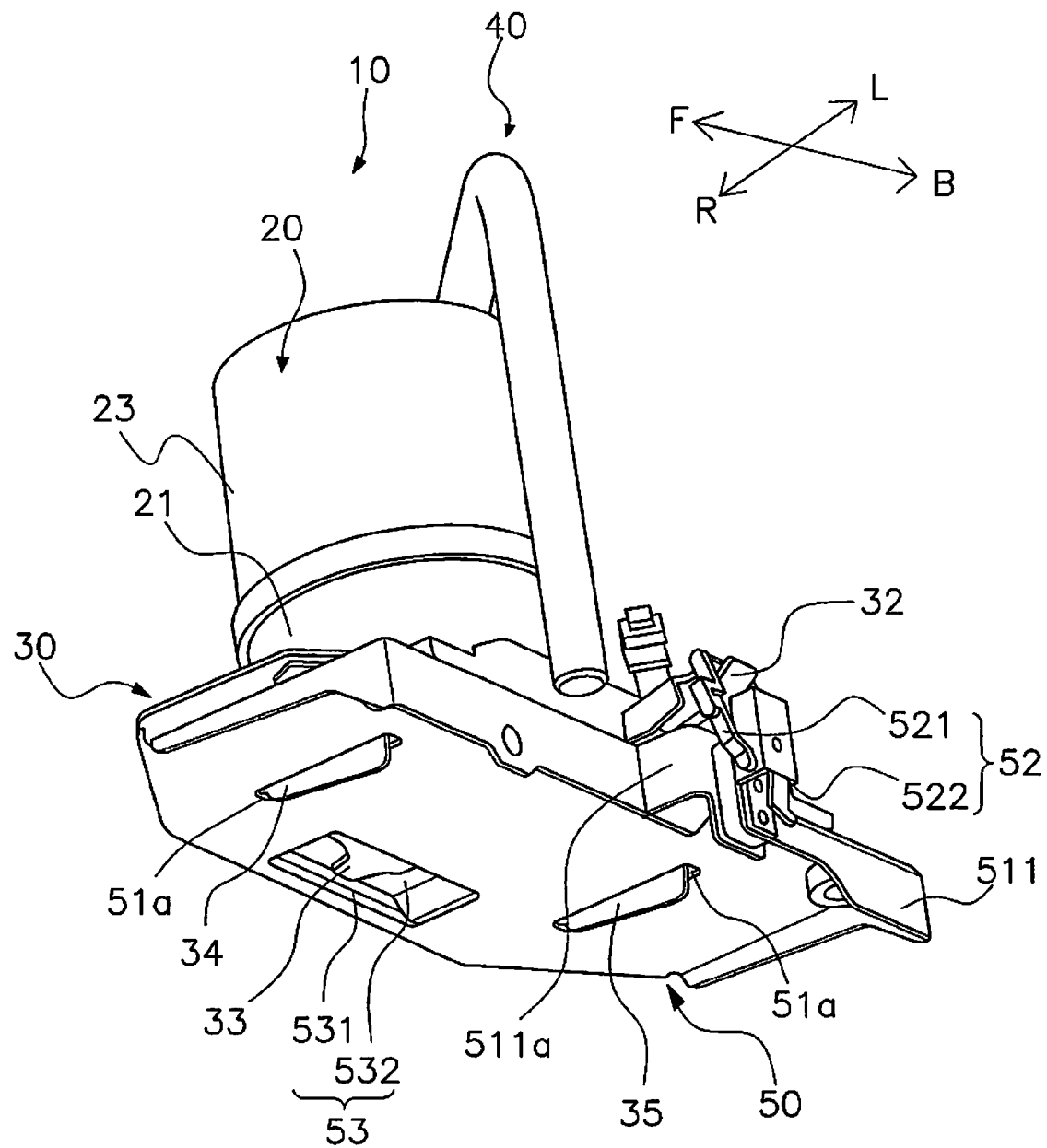
FIG. 6 is an oblique view of the state when the rotating light and base component in FIG. 2 are viewed from the lower-left side.

FIG. 6 is an oblique view of the rotating light 10 and base component 50, as viewed from the lower front of the left lateral side face 5c.

As shown in FIGS. 4 and 5, a first through-groove 51a and a second through-groove 51b are formed in the left and right direction in the base main body 51. As shown in FIG. 6, in a state in which the attachment component 30 has been attached to the base component 50, the first positioning tab 34 mates with the first through-groove 51a, and the second positioning tab 35 mates with the second through-groove 51b.

As shown in FIG. 4, a border part 511 is formed facing downward form the end on the left lateral side face 5c side of the base main body 51. The center portion 511a in the front-back direction of the border part 511 protrudes toward the left lateral side face 5c side, and the clasp main body 52 is attached to this center portion 511a.

The clasp main body 52 constitutes a fastener (also called a snap fastener) along with the engaged component 32 of the attachment component 30. The clasp main body 52 has a hook 521 that engages with the engaged component 32, and an operating lever 522. The hook 521 is engaged with the engaged component 32 by hooking the hook 521 onto the engaged component 32 of the attachment component 30 and then moving the operating lever 522 downward.

The guide component 53 is provided at a position opposite the clasp main body 52 of the base main body 51 (the center in the front-back direction of the end on the right lateral side face 5a side), and as shown in FIG. 4, is constituted by a through-hole 531 and a restrictor 532. The through-hole 531 is formed in the base main body 51. As shown in FIG. 5, the restrictor 532 is formed to cover the upper side of the through-hole 531, is attached to the base main body 51 at its front end portion 532a and rear end portion 532b, and its center portion 532c between the front end portion 532a and the rear end portion 532b is located above the through-hole 531. Specifically, the front end portion 532a is located on the front side of the through-hole 531, and the rear end portion 532b is located on the rear side of the through-hole 531. The center portion 532c is formed at a position that is higher than the upper face of the base main body 51, and a gap 533 is formed between the base main body 51 and the center portion 532c (see FIG. 12 (discussed below)).

1-6. Handle

The handle 40 is portal-shaped and is formed by bending a single rod-shaped member. As shown in FIG. 3, the handle 40 has a first rod-shaped part 41 formed facing upward from the attachment component 30, a second rod-shaped part 42 formed facing upward from the attachment component 30, and a third rod-shaped part 43 that connects the upper end 41a of the first rod-shaped part 41 to the upper end 42a of the second rod-shaped part 42.

Figure 7:
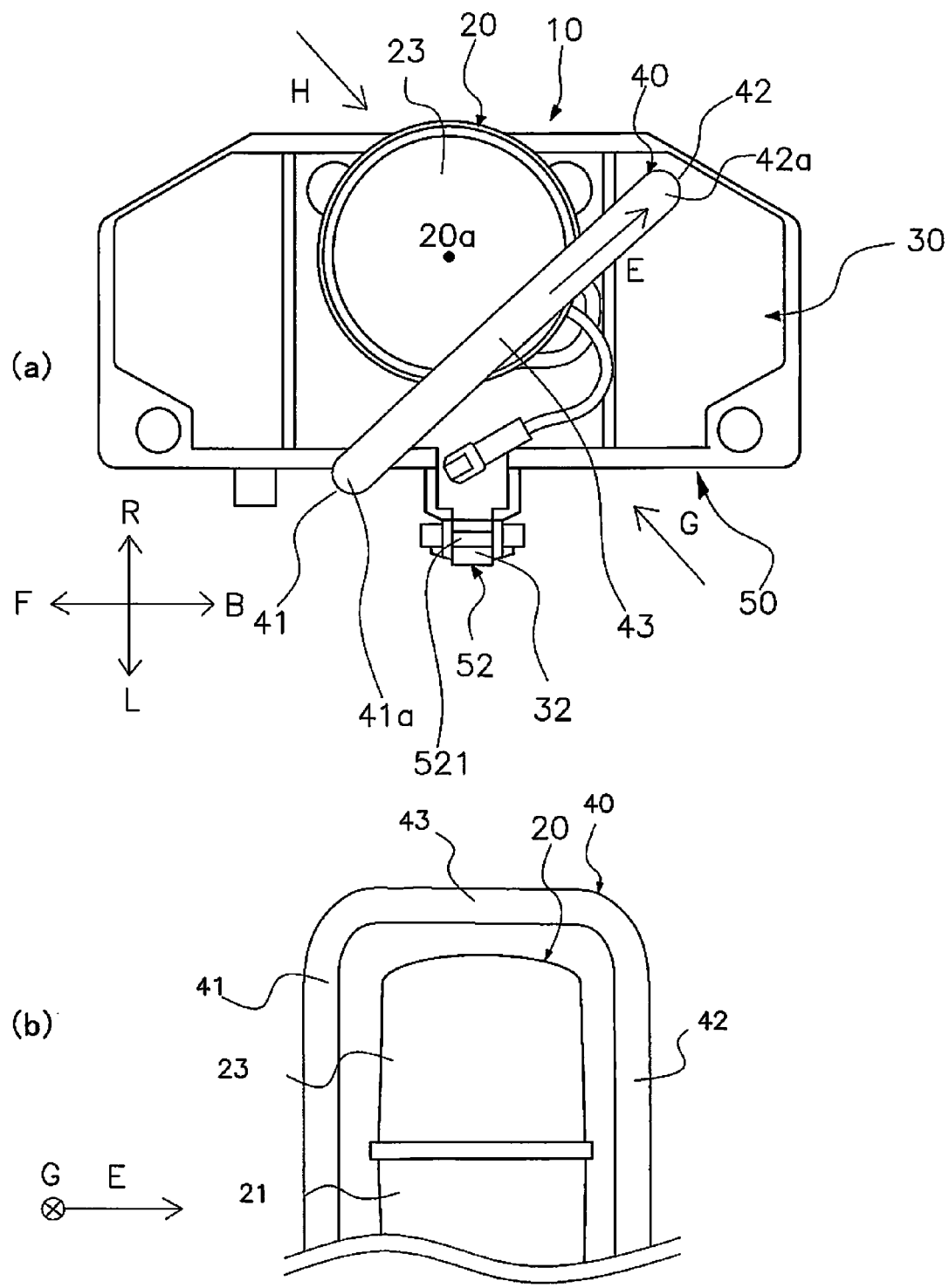
FIG. 7(a) is a plan view of the rotating light and base component in FIG. 2 when viewed from above.
FIG. 7(b) is a partial side view of FIG. 7(a)
Figure 8:
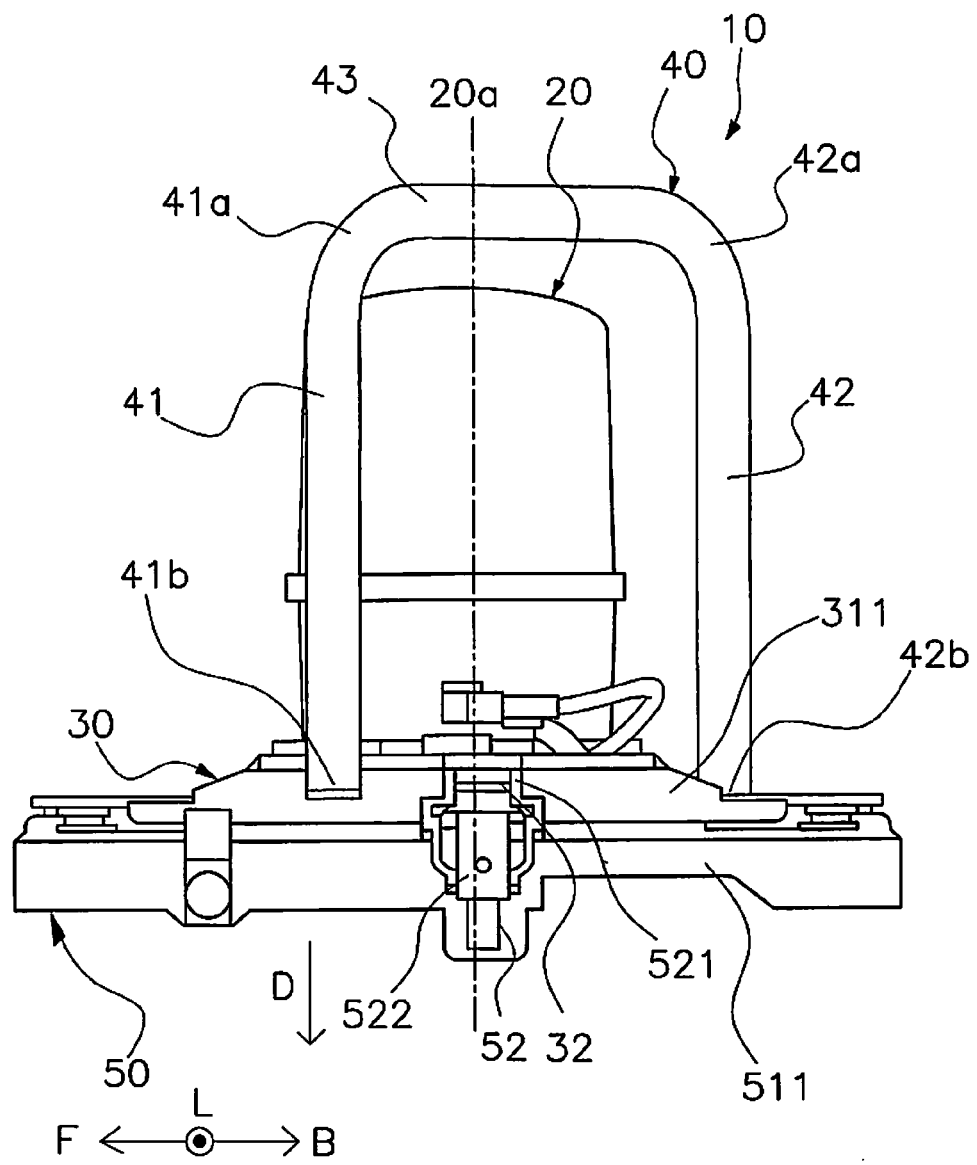
FIG. 8 is a side view of the rotating light and base component in FIG. 2 when viewed from the left side.

FIG. 7(a) is a plan view of the rotating light 10 and the base component base component 50 when viewed from above. FIG. 8 is a side view of the rotating light 10 and the base component 50 when viewed from the left lateral side face 5c side.

1-6-1. First Rod-Shaped Part

As shown in FIG. 7(a), the first rod-shaped part 41 is disposed on the outside of the rotating light main body 20 in the left direction, and as shown in FIG. 8, part of the first rod-shaped part 41 is superposed with the rotating light main body 20 in a side view as seen from the left side. Also, the first rod-shaped part 41 is disposed more to the front than the engaged component 32, and is disposed more to the front than the center axis 20a of the rotating light main body 20.

As shown in FIG. 4, the lower end 41b of the first rod-shaped part 41 is located on the left side of the border part 311, and the border part 311 is welded to the side face of the lower end 41b. FIG. 4 shows the connected portion as P1.

1-6-2. Second Rod-Shaped Part

As shown in FIG. 7(a), the second rod-shaped part 42 is provided on the rear side of the rotating light main body 20, and as shown in FIG. 3, the lower end 42b thereof is connected to the upper face of the third flat part 31c. As shown in FIG. 7(a), the second rod-shaped part 42 is shifted more to the right side (the inside of the work vehicle) than the center axis 20a, and part of the second rod-shaped part 42 is superposed with the rotating light main body 20 when viewed from the rear.

1-6-3. Third Rod-Shaped Part

The third rod-shaped part 43 is provided horizontally to connect the upper end 42a of the second rod-shaped part 42 with the upper end 41a of the first rod-shaped part 41. The third rod-shaped part 43 is located at a position that is higher than the height of the rotating light main body 20. As shown in FIG. 7(a), part of the third rod-shaped part 43 is superposed with the rotating light main body 20 when viewed from above (in plan view), and is shifted to the left rear from the center axis 20a. If we let the lengthwise direction of the third rod-shaped part 43 be as indicated by the arrow E, FIG. 7(b) is a side view of the area near the third rod-shaped part 43 from the side and perpendicular to the lengthwise direction (the arrow E). Directions perpendicular to the lengthwise direction are the directions indicated by the arrows G and H in FIG. 7(a). The arrow G direction is a diagonal left rear direction, and the arrow H direction is a diagonal front right direction. That is, FIG. 7(b) is a side view of the area near the third rod-shaped part 43 viewed along the arrow G direction. As shown in FIG. 7(b), the third rod-shaped part 43 is disposed on the upper side of the rotating light main body 20 as viewed from the side and perpendicular to the lengthwise direction.

Figure 9:
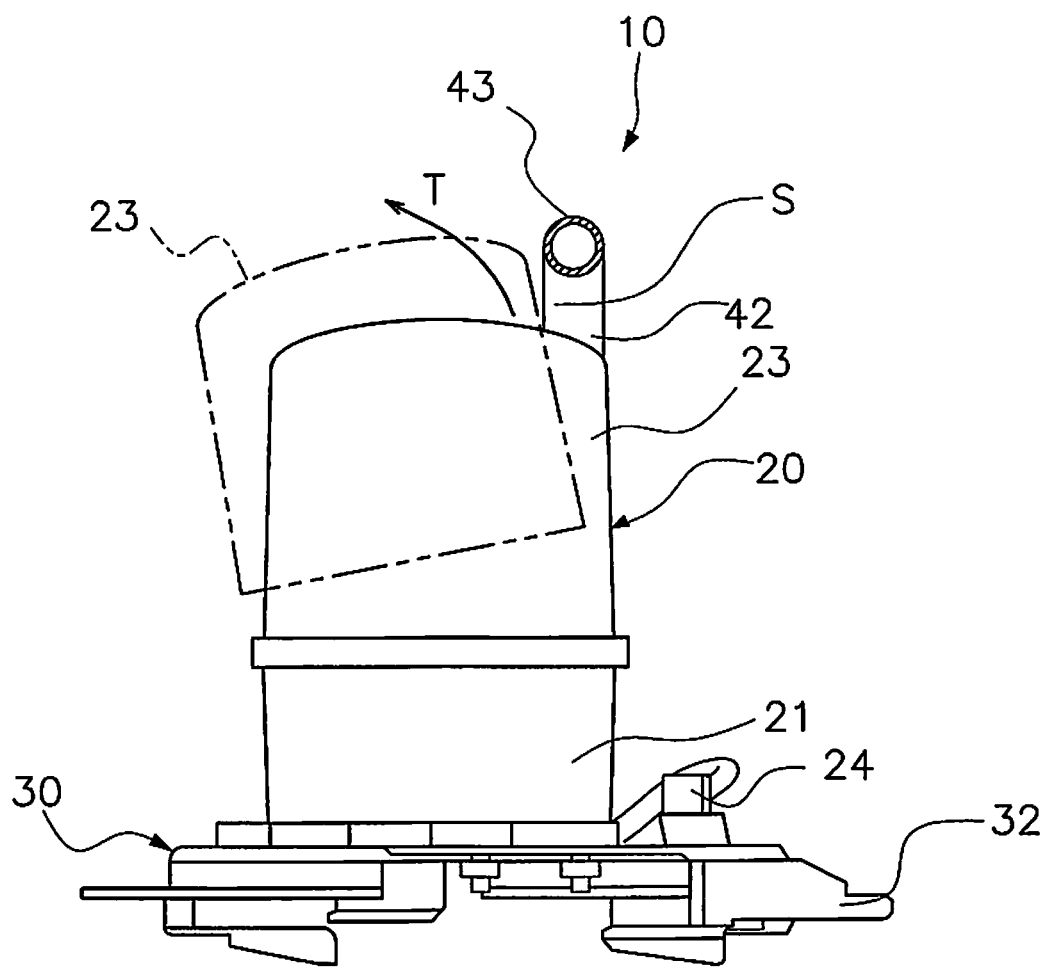
FIG. 9 is a diagram of the rotating light in FIG. 2 when viewed diagonally from the front left direction.

FIG. 9 is a three-quarter view of the rotating light 10 from the left front, in which the first rod-shaped part 41 is not depicted. As shown in FIG. 9, a space S is formed between the rotating light 10 and the third rod-shaped part 43. The cover member 23 passes through (see the arrow T) this space S when the cover member 23 is removed during replacement of the bulb 22. Specifically, by forming the space S through which the cover member 23 passes between the third rod-shaped part 43 and the rotating light 10, the cover member 23 can be removed even though the handle 40 is provided to surround the rotating light main body 20 as in this exemplary embodiment, which allows the bulb 22 to be replaced with ease. In FIG. 9, the cover member 23 that is being removed is indicated by the two-dot chain line.

2. Operation 2-1. Attachment Operation

Figure 10:
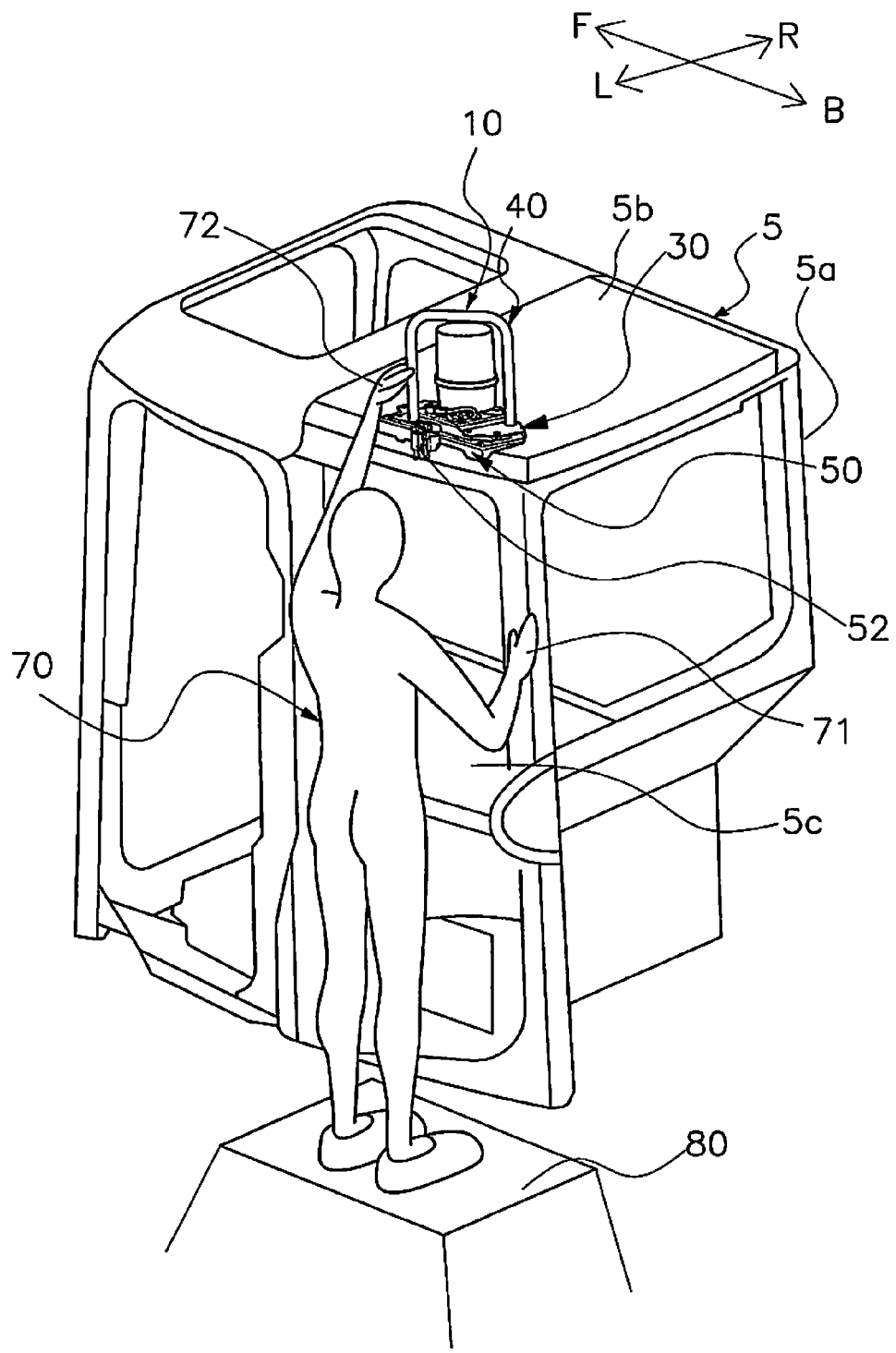
FIG. 10 is an oblique view of the state when an operator is attaching the rotating light in FIG. 2 to the roof of the cab.

FIG. 10 is a diagram of the state when an operator is attaching the rotating light 10 to the roof 5*b* of the cab 5.

As shown in FIG. 10, the operator 70 climbs onto a step or other such base 80, holds on near the rear end of the left lateral side face 5*c* of the cab 5 with his right hand 71 to steady his body, and holds the rotating light 10 with his left hand 72 to attach it to the base component 50. The base component 50 is fixed to the roof 5*b* as discussed above.

Figure 11:
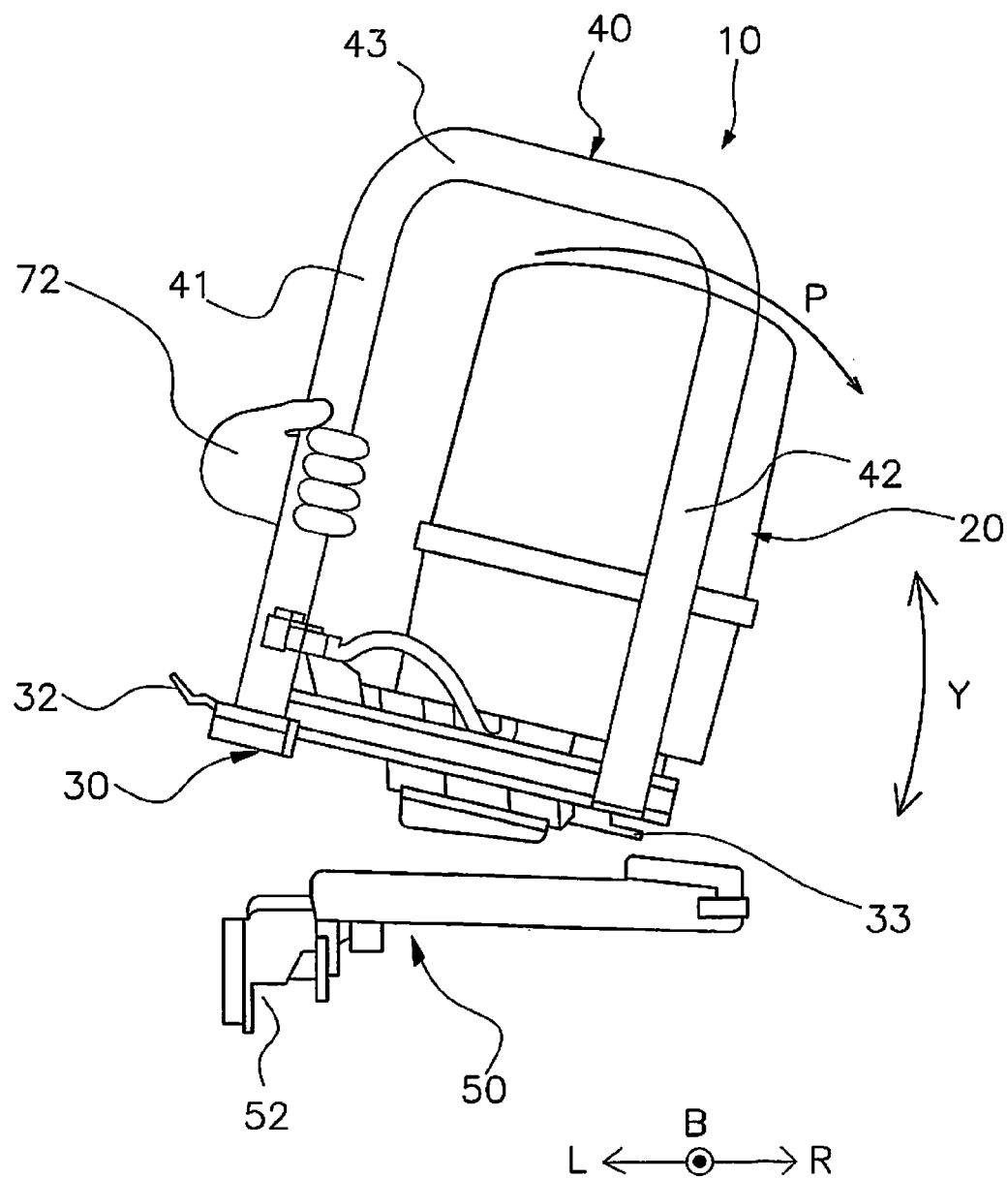
FIG. 11 is a diagram of the state when the rotating light in FIG. 2 is being attached to the roof of the cab, as viewed from the rear.

FIG. 11 is a diagram of the state when the rotating light 10 is being attached to the base component 50, as viewed from the rear. As shown in FIG. 11, the operator 70 holds the first rod-shaped part 41 of the rotating light 10 and inserts the restricted component 33 into the gap 533 of the guide component 53 while the restricted component 33 side of the rotating light 10 is lowered below the engaged component 32 side.

Figure 12:
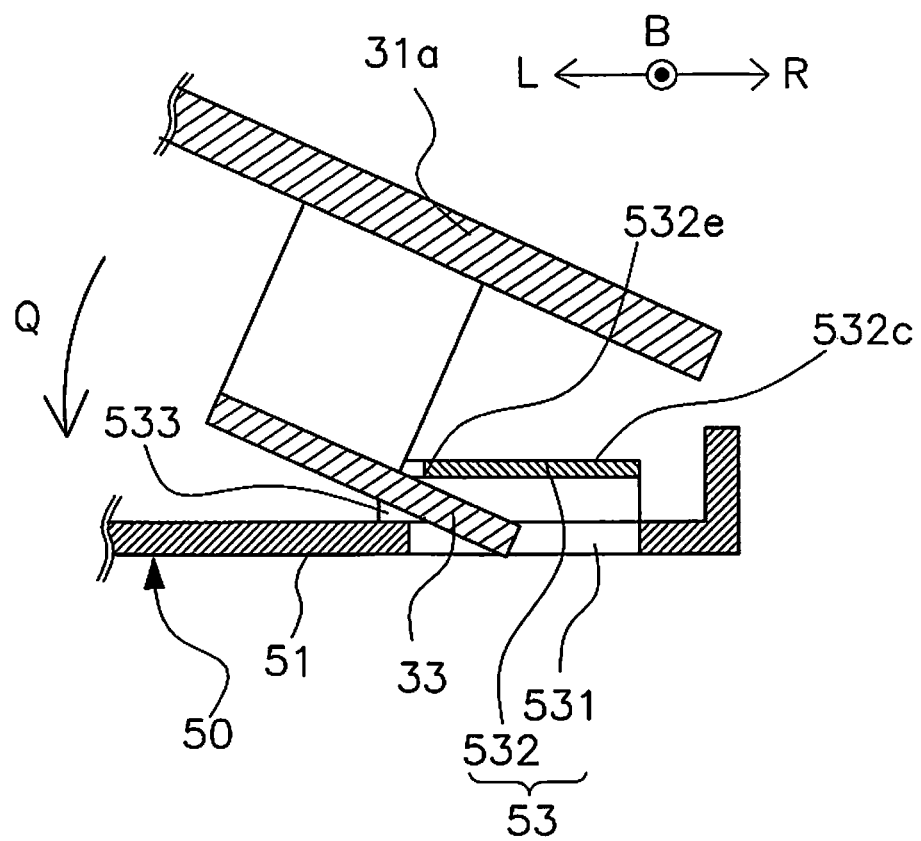
FIG. 12 is a cross section of the state when a restricted component of the rotating light in FIG. 2 is inserted into the gap of a guide component.

FIG. 12 is a detailed cross section of the state when the restricted component 33 is inserted into the gap 533 of the guide component 53. As shown in FIG. 12, since the through-hole 531 is formed in the lower side of the restrictor 532, the distal end of the restricted component 33 can be inserted into the through-hole 531, so the restricted component 33 can be easily inserted into the gap 533 diagonally from above.

Here, because the first rod-shaped part 41 is provided in the up and down direction, the position of the rotating light 10 in the up and down direction (see the arrow Y in FIG. 11) is easy to adjust. Furthermore, as illustrated in FIG. 8, the first rod-shaped part 41 is provided closer to the center axis 20*a* of the rotating light main body 20, which means that the first rod-shaped part 41 is provided at a position closer to the center of gravity of the rotating light 10, and this makes it easier to adjust the position of the rotating light 10 in the arrow Y direction.

After this, in a state in which the restricted component 33 is in contact with the end 532*e* on the left side of the restrictor 532 (see FIG. 12), the operator 70 rotates the left side of the rotating light 10 downward (the arrow Q) around the end 532*e* to put the rotating light 10 in the attachment position on the base component 50. At this point, the contact plane 27*a* of the second contact component 37 and the contact plane 36*a* of the first contact component 36 of the attachment component 30 are in contact with the base main body 51 of the base component 50, and the first magnet 38 and the second magnet 39 are fixed to the base main body 51 by magnetic force (see FIG. 4).

As shown in FIG. 6, when the rotating light 10 is rotated in the arrow Q direction, the first positioning tab 34 fits into the first through-groove 51*a*, and the second positioning tab 35 fits into the second through-groove 51*b*. This affords more accurate positioning. Also, the first positioning tab 34 and the second positioning tab 35 can be easily fitted into the first through-groove 51*a* and the second through-groove 51*b* because the length in which they extend downward becomes shorter moving toward the end 532*e* that serves as the rotation fulcrum.

Next, the hook 521 of the clasp main body 52 is hooked onto the engaged component 32 and the operating lever 522 is lowered to engage the hook 521 with the engaged component 32, and the attachment component 30 to which the rotating light main body 20 is fixed is itself fixed to the base component 50. The above-mentioned attachment position can also be called a position at which the hook 521 can be hooked onto the engaged component 32 and the operating lever 522 lowered, that is, a position at which engagement is possible.

Figure 13:
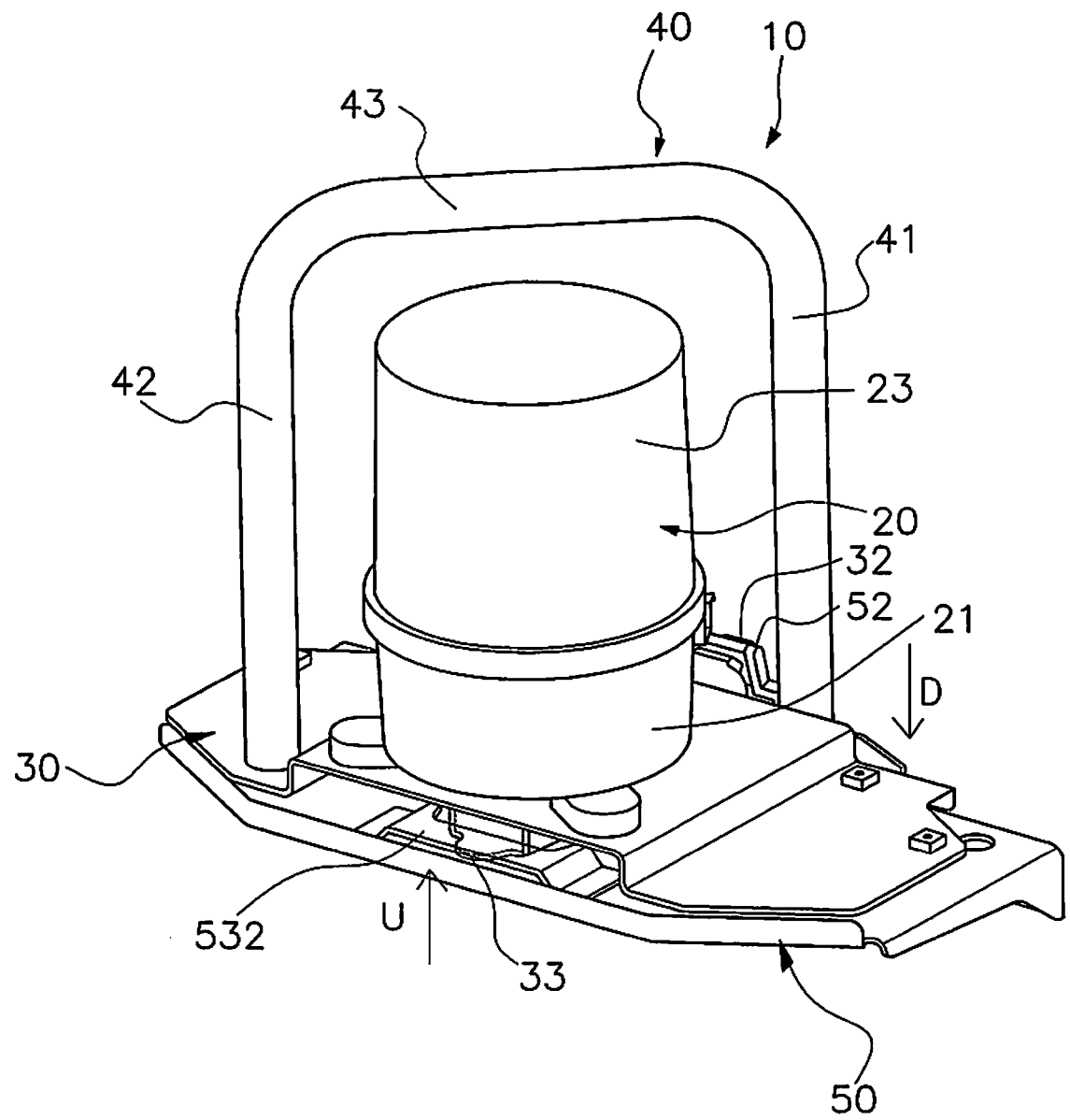
FIG. 13 is an oblique view of the state when the rotating light in FIG. 2 has been attached to the base component, as viewed from the right front.
Figure 13:
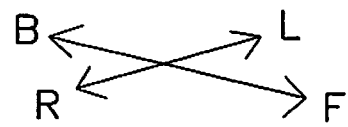

FIG. 13 is an oblique view of the state when the rotating light 10 has been attached to the base component 50, as viewed from the right front. As shown in FIGS. 13 and 6, in a state in which the rotating light 10 has been attached to the base component 50, the restricted component 33 is disposed on the lower side of the restrictor 532.

As discussed above, an engaged state is achieved by hooking the hook 521 onto the engaged component 32 and lowering the operating lever 522. In this engaged state, a downward force is exerted on the engaged component 32 side by the clasp main body 52 (see the arrow D). Accordingly, an upward force (see the arrow U) is exerted on the restricted component 33 located on the opposite side from the engaged component 32 and flanking the rotating light main body 20, but because the restrictor 532 is located on the upper side of the restricted component 33, the restricted component 33 hits the restrictor 532 and its movement is restricted. This fixes the rotating light 10 to the base component 50.

Because the first magnet 38 and the second magnet 39 are provided to the lower face of the attachment component 30, the attachment component 30 is fixed to the base main body 51 by the magnetic force of the first magnet 38 and the second magnet 39. Therefore, even when the operator temporarily lets go of the handle 40 with his left hand 72 to fix the attachment component 30 to the base component 50 with the clasp main body 52 by using the left hand 72, the rotating light 10 will be prevented from accidentally falling.

2-2. Removal Operation

In transporting the hydraulic excavator 100, when the rotating light 10 needs to be removed, the operating lever 522 of the clasp main body 52 is moved upward and the hook 521 is unhooked from the engaged component 32. After this, the first rod-shaped part 41 is grasped and the engaged component 32 side is lifted up to unlatch the restricted component 33 from the guide component 53, allowing the rotating light 10 to be removed from the base component 50.

Even after the fixing by the clasp main body 52 is released, the attachment component 30 will still be fixed to the base main body 51 by the magnetic force of the first magnet 38 and the second magnet 39, which prevents the rotating light 10 from accidentally falling.

The hydraulic excavator 100, which is an example of a work vehicle, of this exemplary embodiment is a work vehicle equipped with the work implement 4, and includes the cab 5 and the rotating light 10. The cab 5 has the roof 5*b* provided to its upper part, and the left lateral side face 5*c* (an example of a second lateral side face) and the right lateral side face 5*a* (an example of a first lateral side face) provided on the left and right, respectively. The rotating light 10 is removably disposed on the roof 5*b* of the cab 5. The rotating light 10 includes the rotating light main body 20, the attachment component 30, and the handle 40. The attachment component 30 is attached to the lower side of the rotating light main body 20, and the rotating light main body 20 is attached to the roof 5*b*. The handle 40 is portal-shaped and fixed to the attachment component 30, and has the first rod-shaped part 41, the second rod-shaped part 42, and the third rod-shaped part 43. The first rod-shaped part 41 and the second rod-shaped part 42 are formed facing upward from the attachment component 30. The third rod-shaped part 43 connects the first rod-shaped part 41 and the second rod-shaped part 42. The first rod-shaped part 41 is disposed ahead of the second rod-shaped part 42. The second rod-shaped part 42 is disposed more to the rear than the rotating light main body 20, and is disposed more on the right lateral side face 5*a* side than the first rod-shaped part. As shown in FIG. 7(*b*), the third rod-shaped part 43 is disposed on the upper side of the rotating light main body 20 when viewed from the side and perpendicular to the lengthwise direction (the arrow E direction) (when viewed along the arrow G direction).

When the rotating light 10 is attached to the roof 5*b* of the cab 5, because the roof 5*b* is located high up, as shown in FIG. 10, the operator 70 usually supports himself on the cab 5 with his right hand 71, and uses just the other (left) hand 72 to attach the rotating light 10. In this process, the operator 70 is apt to exert a force in the up and down direction (see the arrow Y in FIG. 11) on the rotating light 10 by grabbing onto the first rod-shaped part 41, which is formed facing upward. Therefore, even when the rotating light 10 is attached to the roof 5*b* of the cab 5 with one hand, the rotating light 10 tends to be prevented from shaking in the up and down direction (see the arrow Y in FIG. 11), and is therefore easier to attach and remove.

Also, because the third rod-shaped part 43 of the handle 40 is provided more on the upper side than the rotating light main body 20, the third rod-shaped part 43 will block less of the light from the rotating light main body 20.

Also, because the handle 40 is portal-shaped, when the rotating light 10 is removed from the cab 5, the third rod-shaped part 43 can be grasped, making the rotating light easy to carry.

Also, because the handle 40 is portal-shaped, it will have adequate strength.

Also, because the second rod-shaped part 42 is thus disposed more to the rear than the rotating light main body 20, objects can be prevented from colliding with the rotating light main body 20 from the rear.

As shown in FIG. 7(*a*), the hydraulic excavator 100 in this exemplary embodiment is such that part of the third rod-shaped part 43 is superposed with the rotating light main body 20 in plan view.

Thus, forming the handle 40 to straddle the rotating light main body 20 allows the first rod-shaped part 41 or the second rod-shaped part 42 to be disposed closer to the center of gravity of the rotating light 10. This makes it easier for the operator 70 to prevent shaking of the rotating light 10 in the up and down direction (see the arrow Y in FIG. 11).

With the hydraulic excavator 100 in this exemplary embodiment, the rotating light main body 20 has the base member 21, the bulb 22 (an example of a light source), and the cover member 23. The base member 21 is fixed to the attachment component 30. The bulb 22 is disposed on the inside of the base member 21. The cover member 23 covers the bulb 22 from above and is removably attached to the base member 21. As shown in FIG. 9, a specific space S, through which the cover member 23 passes when the cover member 23 is removed from the base member 21, is formed between the third rod-shaped part 43 and the cover member 23.

Because the specific space S is thus formed between the third rod-shaped part 43 and the cover member 23, even though the handle 40 is provided to surround the rotating light main body 20, the cover member 23 can still be easily attached to and removed from the base member 21, making it easier to replace the bulb 22.

With the hydraulic excavator 100 in this exemplary embodiment, the work implement 4 is disposed to the side of the right lateral side face 5*a* of the cab 5. The rotating light 10 is disposed at the end on the left lateral side face 5*c* side of the roof 5*b*. The first rod-shaped part 41 is disposed more to the left lateral side face 5*c* side than the rotating light main body 20. Part of the first rod-shaped part 41 is superposed with the rotating light main body 20 when viewed from the left lateral side face 5*c* side (from the left side).

Because the rotating light 10 is thus disposed on the upper side of the left lateral side face 5*c* of the cab 5 on the opposite side from the work implement 4, the operator 70 can attach the rotating light 10 from outside the hydraulic excavator 100, without having to go inside the hydraulic excavator 100.

Also, because part of the first rod-shaped part 41 is superposed with the rotating light main body 20, the first rod-shaped part 41 can be disposed closer to the rotating light main body 20. That is, because the first rod-shaped part 41 can be disposed closer to the center of gravity of the rotating light 10, the operator 70 can more easily prevent shaking of the rotating light 10 in the up and down direction (the Y direction).

Also, because the first rod-shaped part 41 is disposed more to the left lateral side face 5*c* side than the rotating light main body 20, objects can be prevented from colliding with the rotating light main body 20 from the left lateral side face 5*c* side.

The hydraulic excavator 100 in this exemplary embodiment further includes the base component 50, which is fixed to the roof 5*b* and to which the attachment component 30 is removably attached. The base component 50 has the clasp main body 52 (an example of an engagement component) and the guide component 53. The clasp main body 52 can engage with the attachment component 30. The guide component 53 guides the attachment component 30 to a position where it can be engaged by the clasp main body 52, and has the restrictor 532. The restrictor 532 restricts movement of the attachment component 30 in a state in which it has been engaged with the clasp main body 52 after being guided. The attachment component 30 has the engaged component 32 and the restricted component 33. The engaged component 32 is engaged with the clasp main body 52. The restricted component 33 is provided on the opposite side of the engaged component 32, straddling the rotating light main body 20. In a state in which the clasp main body 52 has been engaged with the engaged component 32, as shown in FIG. 13, the engaged component 32 is biased downward (the arrow D direction), which causes the restricted component 33 to be biased upward (the arrow U direction) and hit the restrictor 532, and the attachment component 30 to be fixed to the base component 50.

Consequently, the attachment component 30 can be fixed to the base component 50 merely by disposing the attachment component 30 on the base component 50 along the guide component 53, and engaging the base component 50 and the attachment component 30, so the rotating light 10 can be easily attached to the roof 5b. Also, the rotating light 10 can be easily removed from the roof 5b merely by releasing the engagement.

With the hydraulic excavator 100 in this exemplary embodiment, the work implement 4 is disposed to the side of the right lateral side face 5a of the cab 5. The rotating light 10 is disposed at the end of the roof 5b on the left lateral side face side 5c. The clasp main body 52 (an example of an engagement component) and the engaged component 32 are provided on the left lateral side face 5c side of the rotating light main body 20.

As shown in FIG. 10, because the clasp main body 52 is disposed on the upper side of the left lateral side face 5c of the cab 5 on the opposite side from the work implement 4, the operator 70 can engage and disengage the clasp main body 52 from outside the hydraulic excavator 100, without having to go inside the hydraulic excavator 100, which makes it easier to remove and attach the rotating light.

With the hydraulic excavator 100 in this exemplary embodiment, the attachment component 30 further has the first magnet 38 and the second magnet 39 (an example of fixing members) that magnetically fix the base component 50 to the lower face of the attachment component 30.

The first magnet 38 and the second magnet 39 magnetically fix the attachment component 30 to the base component 50 such that the rotating light 10 is less likely to accidentally fall off the roof when the clasp main body 52 is disengaged from the engaged component 32.

The rotating light 10 of the hydraulic excavator 100 in this exemplary embodiment is removably disposed on the roof 5b provided at the upper part of the cab 5, and has the rotating light main body 20, the attachment component 30, and the handle 40. The attachment component 30 is provided on the lower side of the rotating light main body 20, and is used to attach the rotating light main body 20 to the roof 5b. The handle 40 is portal-shaped and is fixed to the attachment component 30. The handle 40 has the first rod-shaped part 41, the second rod-shaped part 42, and the third rod-shaped part 43. The first rod-shaped part 41 and the second rod-shaped part 42 are formed facing upward from the attachment component 30. The third rod-shaped part 43 connects the first rod-shaped part 41 and the second rod-shaped part 42. Part of the third rod-shaped part 43 is superposed with the rotating light main body 20 in plan view.

Thus, forming the handle 40 to straddle the rotating light main body 20 allows the first rod-shaped part 41 or the second rod-shaped part 42 to be disposed closer to the center of gravity of the rotating light 10. Therefore, the operator can more easily prevent the rotating light 10 from shaking in the up and down direction, which makes it easier to attach and remove the rotating light 10 to and from the roof 5b.

An exemplary embodiment of the present invention is described above, but the present invention is not limited to or by the above exemplary embodiment, and various modifications are possible without departing from the gist of the invention.

In the above exemplary embodiment, part of the third rod-shaped part 43 is superposed with the rotating light main body 20 when viewed from above, but part of the third rod-shaped part 43 need not be superposed with the rotating light main body 20 when viewed from above.

Figure 14:
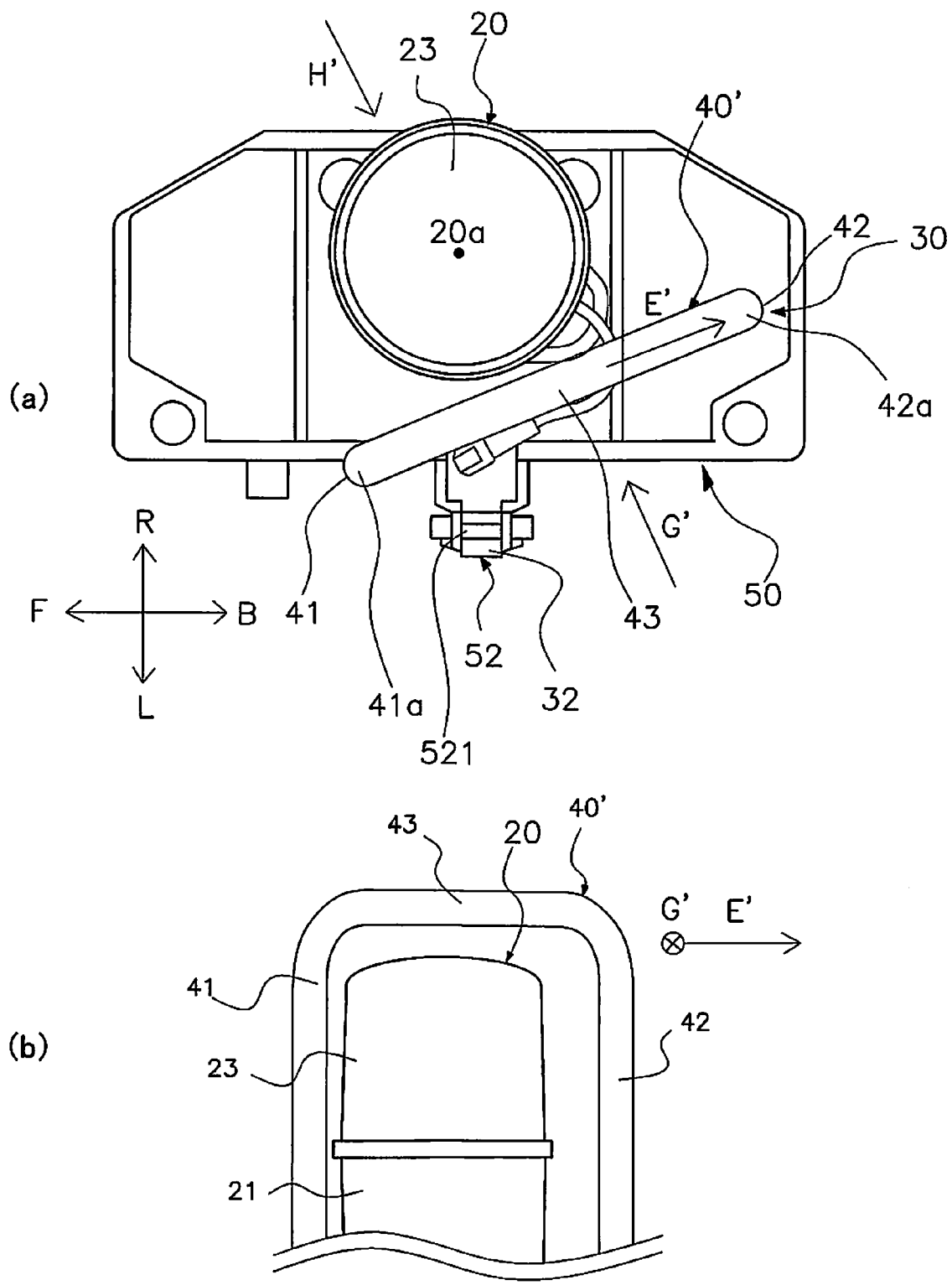
FIG. 14(a) is a plan view of the rotating light and the base component in accordance with another exemplary embodiment of the present invention.
FIG. 14(b) is a partial side view of FIG. 14(a).

For example, as with the handle 40' shown in FIG. 14(a), the configuration may be such that the second rod-shaped part 42 is disposed more to the left than in the above exemplary embodiment, so that the third rod-shaped part 43 is not superposed with the rotating light main body 20 when viewed from above. Here again, when viewed along the arrow G' direction, which is one side (the arrow G' or H') perpendicular to the lengthwise direction (the arrow E'), the third rod-shaped part 43 is disposed on the upper side of the rotating light main body 20, as shown in FIG. 14(b).

Thus, part of the third rod-shaped part 43 need not be superposed with the rotating light main body 20, and the third rod-shaped part 43 is disposed on the upper side of the rotating light main body 20 when viewed from the side and perpendicular to the lengthwise direction (that is, in side view).

In the above exemplary embodiment, the first rod-shaped part 41 and the second rod-shaped part 42 are the same height, and the third rod-shaped part 43 is formed horizontally, but the first rod-shaped part 41 and the second rod-shaped part 42 may have different heights, and the third rod-shaped part 43 may not be horizontal.

In the above exemplary embodiment, the first rod-shaped part 41 and the second rod-shaped part 42 are formed vertically, but may instead be inclined. The first and second rod-shaped parts 41 and 42 are formed facing upward.

In the above exemplary embodiment, the third rod-shaped part 43 is connected to the upper end 41a of the first rod-shaped part 41 and to the upper end 42a of the second rod-shaped part 42, but need not connect the upper ends 41a and 42a. The upper end 41a of the first rod-shaped part 41 and/or the upper end 42a of the second rod-shaped part 42 may protrude upward from the third rod-shaped part 43. This configuration is also encompassed by the "portal shape" mentioned above.

The work vehicle and rotating light pertaining to the exemplary embodiments of the present invention make it easier to attach and remove a rotating light, and can be widely applied to various kinds of work vehicle, such as a hydraulic excavator.

The invention claimed is:

1. A work vehicle equipped with a work implement, comprising:
   a cab having a roof provided to the upper part, the cab having a first lateral side face and a second lateral side face; and
   a base component fixed to an upper face of the roof;
   a rotating light removably attached to the base component,
   the rotating light including
      a rotating light main body,
      an attachment component on which the rotating light main body is arranged, the attachment component being disposed underneath the rotating light main body and configured to be attached to the base component, the attachment component and the base component being configured to engage with each other such that the rotating light assumes a prescribed attachment position when the rotating light is attached to the base component, and
      a portal-shaped handle non-movably fixed to the attachment component,
   the handle having a first rod-shaped part and a second rod-shaped part that extend upward from the attachment component, and a third rod-shaped part that connects the first rod-shaped part and the second rod-shaped part together,
   the first rod-shaped part being disposed forward of the second rod-shaped part in a lengthwise direction of the work vehicle, the first rod-shaped part being disposed more to the second lateral side face side than the rotating light main body, and the first rod-shaped part being superposed with the rotating light main body when the rotating light is viewed from the second lateral side face of the cab while the rotating light is in the prescribed attachment position with respect to the base component, the second rod-shaped part being disposed to the rear of the rotating light main body, and disposed more to the first lateral side face side than the first rod-shaped part, and the third rod-shaped part being disposed at a position higher than a height of the rotating light main body in a vertical direction of the work vehicle such that an upper surface of the third rod-shaped member forms an uppermost surface of the entire rotating light.

2. The work vehicle according to claim 1, wherein part of the third rod-shaped part is superposed with the rotating light main body in a plan view of the work vehicle.

3. The work vehicle according to claim 2, wherein the rotating light main body has
- a base member fixed to the attachment component;
- a light source disposed on the inside of the base member; and
- a cover member that covers the light source from above and is removably attached to the base member, wherein a gap is formed between the third rod-shaped part and the cover member to allow the cover member to pass through when the cover member is removed from the base member.

4. The work vehicle according to claim 1, wherein the work implement is disposed to the side of the first side lateral face of the cab, the base component is disposed at an end of the roof on the second lateral side face side.

5. The work vehicle according to claim 1, wherein
the base component has
- an engagement component capable of engaging with the attachment component; and
- a guide component that guides the attachment component to a position where it can be engaged by the engagement component, the guide component having a restrictor that restricts movement of the attachment component in a state of having been engaged with the engagement component after being guided, the attachment component has:
- an engaged component that is engaged to the engagement component; and
- a restricted component that is provided on the opposite side of the engaged component, flanking the rotating light main body, and in a state in which the engagement component has engaged the engaged component, the engaged component is biased downward and the restricted component is biased upward to hit the restrictor to fix the attachment component to the base component.

6. The work vehicle according to claim 5, wherein the work implement is disposed to the side of the first side lateral face of the cab, the base component is disposed at the end of the roof on the second lateral side face side, and the engagement component and the engaged component are provided on the second lateral side face side of the rotating light main body.

7. The work vehicle according to claim 6, wherein the attachment component further has on its lower face a fixing member that magnetically fixes to the base component, a part of the third rod-shaped part is superposed with the rotating light main body when viewed from above, the engagement component and the engaged component are disposed in the approximate center of the rotating light main body in the front-back direction when viewed from the side on the opposite side from the work implement, and the first rod-shaped part is disposed forward of the engagement component and to the outside of the rotating light main body.

8. The work vehicle according to claim 1, wherein a bottommost end of at least one of the first and second rod-shaped parts being disposed lower than a bottommost part of the rotating light main body when the attachment component is attached to the roof.

9. A work vehicle equipped with a work implement, comprising:
- a cab having a roof provided on an upper portion of the cab, the cab having a first lateral side face and a second lateral side face; and
- a base component fixed to an upper face of the roof;
- a rotating light removably unattached to the base component, wherein the rotating light includes
- an attachment component configured to be detachably attached to the base component, the attachment component and the base component being configured to engage with each other such that the rotating light assumes a prescribed attachment position when the rotating light is attached to the base component,
- a rotating light main body arranged on the attachment component, and
- a portal-shaped handle fixed to the attachment component independently from the rotating light main body, the portal-shaped handle and the rotating light main body both extending upward from the attachment component in a vertical direction of the work vehicle when the attachment component is attached to the roof, an upper portion of the portal-shaped handle being oriented in a diagonal direction with respect to a lengthwise direction of the work vehicle when the rotating light is in the prescribed attachment position with respect to the base component.

10. The work vehicle according to claim 9, wherein a bottom surface of the attachment component includes at least one positioning part, an upper surface of the base component includes at least one receiving part configured to mate with the at least one positioning part when the rotating light is in the prescribed attachment position with respect to the base component, and the attachment component is arranged in a prescribed orientation with respect to the roof when the at least one positioning part is mated with the at least one receiving part.

11. The work vehicle according to claim 9, wherein the attachment component is configured to protrude beyond the rotating light main body in at least one of a lengthwise direction and a widthwise direction of the work vehicle, and the portal-shaped handle is fixed to a portion of the attachment component that protrudes beyond the rotating light main body.

12. The work vehicle according to claim 9, wherein the portal-shaped handle includes a first rod-shaped part, a second rod-shaped part, and a third rod-shaped part, the first and second rod-shaped parts extending upward from the attachment component and the third rod-shaped part connecting upper ends of the first rod-shaped part and the second rod-shaped part together.

13. The work vehicle according to claim 12, wherein the third rod-shaped part is the upper portion oriented diagonally with respect to a lengthwise direction of the work vehicle when the rotating light is in the prescribed attachment position with respect to the base component.

14. The work vehicle according to claim 13, wherein when the rotating light is in the prescribed attachment position with respect to the base component, the first rod-shaped part is disposed forward of the second rod-shaped part in a lengthwise direction of the work vehicle, and the second rod-shaped part is disposed to the rear of the rotating light main body.

15. The work vehicle according to claim 12, wherein the third rod-shaped part is disposed at a position higher than a height of the rotating light main body in the vertical direction of the work vehicle.

* * * * *